United States Patent
Zhao

(10) Patent No.: US 11,910,178 B2
(45) Date of Patent: Feb. 20, 2024

(54) ORIENTATED DISPLAY METHOD AND APPARATUS FOR AUDIO DEVICE, AND AUDIO DEVICE

(71) Applicant: GOERTEK INC., Shandong (CN)

(72) Inventor: Jifu Zhao, Shandong (CN)

(73) Assignee: GOERTEK, INC., Shandong (CN)

( * ) Notice: Subject to any disclaimer, the term of this patent is extended or adjusted under 35 U.S.C. 154(b) by 376 days.

(21) Appl. No.: 17/309,136

(22) PCT Filed: Dec. 29, 2018

(86) PCT No.: PCT/CN2018/125232
§ 371 (c)(1),
(2) Date: Apr. 29, 2021

(87) PCT Pub. No.: WO2020/087747
PCT Pub. Date: May 7, 2020

(65) Prior Publication Data
US 2022/0014867 A1    Jan. 13, 2022

(30) Foreign Application Priority Data

Oct. 29, 2018 (CN) .......................... 201811271455.1

(51) Int. Cl.
*H04S 7/00* (2006.01)
*H04N 13/117* (2018.01)
(Continued)

(52) U.S. Cl.
CPC ............... *H04S 7/303* (2013.01); *G05D 3/12* (2013.01); *G06F 1/1605* (2013.01); *G06F 3/167* (2013.01);
(Continued)

(58) Field of Classification Search
CPC ........ H04S 7/303; G06F 1/1605; G06F 3/167; G06T 7/20; H04N 13/366; H04N 13/117;
(Continued)

(56) References Cited

U.S. PATENT DOCUMENTS 5,818,950 A   10/1998  Sakamoto et al.
7,515,174 B1 * 4/2009  Francisco .............. G02B 30/27
                                            348/14.09
(Continued)

FOREIGN PATENT DOCUMENTS

CN        102033549 A       4/2011
CN        102404545 A       4/2012
(Continued)

*Primary Examiner* — Stephen S Hong
*Assistant Examiner* — Broderick C Anderson
(74) *Attorney, Agent, or Firm* — LKGlobal | Lorenz & Kopf, LLP

(57) ABSTRACT

A directional display method and device of audio equipment, and audio equipment are disclosed. The audio equipment comprises a camera module and a display screen that is circumferentially located on sides of the audio equipment. The display screen is rotatable relative to the audio equipment. The method comprises activating the camera module for panoramic shooting to detect a user position in response to an activation signal acquired; determining whether the display screen is in half screen display mode according to a relationship between the user position and a center position of the audio equipment; and when it is determined that the display screen is in half screen display mode, determining a compensation angle of a display direction of a half screen display area relative to the user position, and adjusting the display direction of the half screen display area so that the compensation angle is zero.

10 Claims, 8 Drawing Sheets

(51) Int. Cl.
*H04N 13/366* (2018.01)
*G05D 3/12* (2006.01)
*G06F 1/16* (2006.01)
*G06F 3/16* (2006.01)
*G06T 7/20* (2017.01)
*G10L 15/22* (2006.01)
*H04R 1/02* (2006.01)
*H04N 13/00* (2018.01)

(52) U.S. Cl.
CPC ............... *G06T 7/20* (2013.01); *G10L 15/22* (2013.01); *H04N 13/117* (2018.05); *H04N 13/366* (2018.05); *H04R 1/028* (2013.01); *G10L 2015/223* (2013.01); *H04N 2013/0088* (2013.01); *H04R 2499/15* (2013.01)

(58) Field of Classification Search
CPC ............ H04N 2013/0088; H04R 1/028; H04R 2499/15
USPC .......................................................... 715/716
See application file for complete search history.

(56) References Cited

U.S. PATENT DOCUMENTS

| | | | | |
|---|---|---|---|---|
| 8,572,183 | B2* | 10/2013 | Sharma | G06Q 10/10 709/204 |
| 2003/0220971 | A1* | 11/2003 | Kressin | H04N 7/148 709/204 |
| 2004/0008423 | A1* | 1/2004 | Driscoll, Jr. | H04N 7/15 359/725 |
| 2007/0158515 | A1* | 7/2007 | Dittmer | F16M 11/38 248/920 |
| 2012/0075407 | A1* | 3/2012 | Wessling | H04N 7/15 348/E7.083 |
| 2012/0287160 | A1* | 11/2012 | Guo | G06F 1/1605 345/649 |

FOREIGN PATENT DOCUMENTS

| | | | | |
|---|---|---|---|---|
| CN | 102033549 | B | * 2/2014 | |
| CN | 103744474 | A | 4/2014 | |
| CN | 106155200 | A | 11/2016 | |
| CN | 107643886 | A | 1/2018 | |
| CN | 206894784 | U | 1/2018 | |
| CN | 108105943 | A | 6/2018 | |
| CN | 108551619 | A | 9/2018 | |
| CN | 108614583 | A | 10/2018 | |
| CN | 106155200 | B | * 11/2020 | ........... G06F 1/1601 |
| JP | H0432376 | A | 2/1992 | |

* cited by examiner

ORIENTATED DISPLAY METHOD AND APPARATUS FOR AUDIO DEVICE, AND AUDIO DEVICE

CROSS-REFERENCE TO RELATED APPLICATIONS

This application is a U.S. National-Stage entry under 35 U.S.C. § 371 based on International Application No. PCT/CN2018/125232, filed Dec. 29, 2018 which was published under PCT Article 21(2) and which claims priority to Chinese Application No. 201811271455.1, filed Oct. 29, 2018, which are all hereby incorporated herein in their entirety by reference.

TECHNICAL FIELD

This Application pertains to a directional display method and device of audio equipment, and audio equipment.

BACKGROUND

With the improvement of living standards, more and more smart-home devices have entered our daily lives. As one kind of them, smart audio equipments are immensely popular. Some smart audio equipments on the market, such as smart speakers, are mostly provided with a display screen. The display screen can be used not only to display relevant information, but also to achieve human-computer interaction control of the smart speaker by touching the display screen.

Currently, only a few smart audio equipments have a display screen that can track the user and perform directional display. For example, when the user's position changes, the display screen of the equipment can automatically track the user and adjust the display direction of the display screen. However, the conventional directional display of the smart audio equipment can track single user only, for the interactive use of multiple people, the display function of the smart audio equipment still needs to be enhanced. In addition, other objects, desirable features and characteristics will become apparent from the subsequent summary and detailed description, and the appended claims, taken in conjunction with the accompanying drawings and this background.

SUMMARY

The present disclosure provides a directional display method and device of audio equipment, and audio equipment, to solve the problem that the conventional audio equipment cannot be used for the directional display in the case of multi-person interactive use.

One aspect of the present disclosure provides a directional display method of audio equipment, wherein the audio equipment comprises a camera module and a display screen that is circumferentially located on sides of the audio equipment, the display screen is rotatable relative to the audio equipment, and the method of the present disclosure comprises: activating the camera module for panoramic shooting to detect a user position, in response to an activation signal acquired; determining whether the display screen is in half screen display mode according to a relationship between the user position and a center position of the audio equipment; and when it is determined that the display screen is in half screen display mode, determining a compensation angle of a display direction of a half screen display area relative to the user position, and adjusting the display direction of the half screen display area so that the compensation angle is zero.

The directional display method of the present disclosure detects the user position using a camera module, determines whether the display screen is in half screen display mode according to the relationship between the user position and the center position of the audio equipment, when it is determined that the display screen is in half screen display mode, adjusts the display direction of the half screen display area so that the compensation angle of the display direction of the half screen display area relative to the user position is zero, thereby ensuring that multiple users are all within the display area of the audio equipment and thus improving visual experience of multi-person interaction with the audio equipment.

Another aspect of the present disclosure provides a directional display device of audio equipment, wherein the audio equipment comprises a camera module and a display screen that is circumferentially located on sides of the audio equipment, the display screen is rotatable relative to the audio equipment, and the device of the present disclosure comprises: a detecting unit for activating the camera module for panoramic shooting to detect a user position, in response to an activation signal acquired; a judging unit for determining whether the display screen is in half screen display mode according to a relationship between the user position and a center position of the audio equipment; and a calculating and adjusting unit for, when it is determined that the display screen is in half screen display mode, determining a compensation angle of a display direction of a half screen display area relative to the user position, and adjusting the display direction of the half screen display area so that the compensation angle is zero.

The directional display device of the present disclosure drives the camera module using the detecting unit to detect the user position. The judging unit determines whether the display screen is in half screen display mode according to the relationship between the user position and the center position of the audio equipment. When it is determined that the display screen is in half screen display mode, the calculating and adjusting unit adjusts the display direction of the half screen display area so that the compensation angle of the display direction of the half screen display area relative to the user position is zero, thereby ensuring that multiple users are all within the display area of the audio equipment and thus improving visual experience of multi-person interaction with the audio equipment.

Still another aspect of the present disclosure provides an audio equipment comprising a camera module and a display screen that is circumferentially located on sides of the audio equipment, wherein the display screen is rotatable relative to the audio equipment, the audio equipment further comprises a processor and a machine-readable storage medium having machine-executable instructions stored thereon, and the processor can execute the above directional display method of audio equipment, by reading and executing the machine-executable instructions in the machine-readable storage medium.

The audio equipment of the present disclosure detects the user position using the camera module, determines whether the display screen is in half screen display mode according to the relationship between the user position and the center position of the audio equipment; and when it is determined that the display screen is in half screen display mode, adjusts the display direction of the half screen display area so that the compensation angle of the display direction of the half screen display area relative to the user position is zero, thereby ensuring that multiple users are all within the display area of the audio equipment and thus improving visual experience of multi-person interaction with the audio equipment.

Yet still another aspect of the present disclosure provides a machine-readable storage medium having machine-executable instructions stored thereon, and the machine-executable instructions may realize the above directional display method of audio equipment when executed by a processor.

BRIEF DESCRIPTION OF DRAWINGS

The present invention will hereinafter be described in conjunction with the following drawing figures, wherein like numerals denote like elements, and.

DETAILED DESCRIPTION

Figure 1:
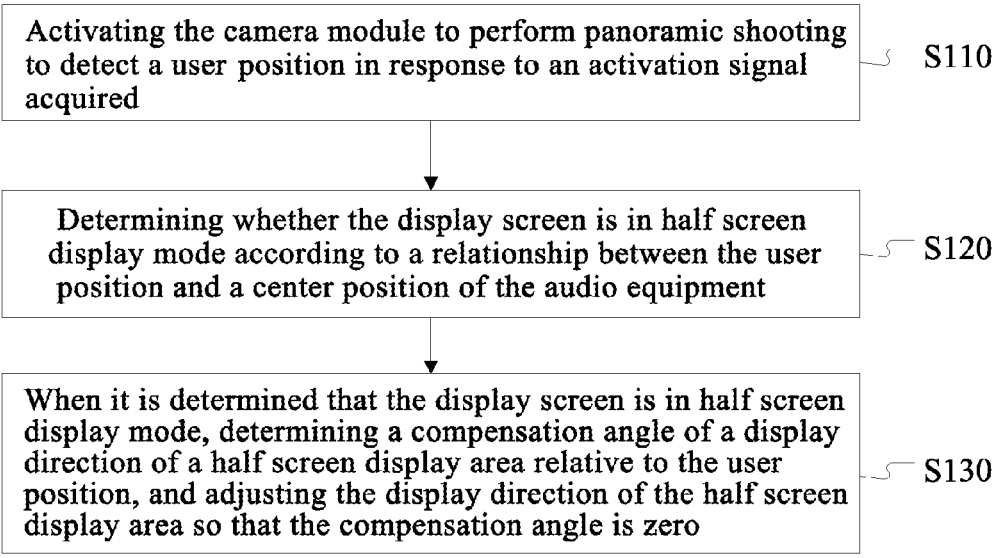
FIG. 1 is a flowchart of a directional display method of audio equipment according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

In order to make the objectives, technical solutions, and advantages of the present disclosure clearer, the embodiments of the present disclosure will be described below in further detail with reference to the drawings.

The embodiments of the present disclosure will be described below with reference to the drawings. However, it should be understood that these descriptions are only exemplary, and are not intended to limit the scope of the present disclosure. In addition, in the following description, the descriptions on well-known structures and techniques are omitted to prevent unnecessary confusion of the concepts of the present disclosure.

The terms used herein are only for describing specific embodiments, and are not intended to limit the present disclosure. The words used herein "a", "an", and "the" are intended to include the plural forms as well, unless the context clearly indicates otherwise. In addition, The terms used herein "comprises", "comprising", "includes" and "including" specify the presence of stated features, steps, operations, and/or components, but do not preclude the presence or addition of one or more other features, steps, operations, and/or components.

All terms (including technical and scientific terms) used herein have the meanings commonly understood by a person skilled in the art, unless otherwise defined. It should be noted that the terms used herein should be interpreted as having meanings consistent with the context of this specification, and should not be interpreted in an idealized or overly rigid manner.

Some block diagrams and/or flowcharts are shown in the drawings. It should be understood that some blocks or combinations of blocks in the block diagrams and/or flowcharts can be implemented by computer program instructions. These computer program instructions can be provided to the processor of a general-purpose computer, a special-purpose computer, or other programmable data processing device, so that these instructions, when executed by the processor, may generate a device for implementing the functions/operations specified in these block diagrams and/or flowcharts.

Therefore, the technology of the present disclosure can be implemented in the form of hardware and/or software (including firmware, microcode, etc.). In addition, the technology of the present disclosure may be in the form of a computer program product on a computer-readable medium having instructions stored thereon, and the computer program product may be used by or in combination with an instruction execution system. In the context of the present disclosure, the computer-readable medium may be any medium that can contain, store, transmit, propagate, or transmit the instructions. For example, the computer-readable medium may include, but is not limited to an electric, magnetic, optical, electromagnetic, infrared or semiconductor system, apparatus, device, or propagation medium. Specific examples of the computer-readable medium include: a magnetic storage device, such as a magnetic tape or a hard disk (HDD); an optical storage device, such as an optical disk (CD-ROM); a memory, such as a random access memory (RAM) or a flash memory; and/or a wired/wireless communication link.

To facilitate describing the control method of the display screen of the audio equipment according to the present embodiment, the components and structure of the audio equipment will be described first through the following embodiment. The audio equipment according to the present embodiment includes products such as smart speaker.

The audio equipment according to the present embodiment comprises a casing enclosed by an upper casing, a lower casing, and a bottom casing. A camera module is provided on the top of the upper casing. The camera module includes at least one panoramic camera, or at least one set of binocular cameras, or a spherical camera array having multiple cameras. The display screen is provided on the upper casing along the circumference of the upper casing. The upper casing is rotatable relative to the lower casing. Structures such as PCB board, micro-motor assembly are provided at the position where the lower casing contacts the upper casing. The PCB board is the main control board of the audio equipment, and the micro-motor assembly may drive the upper casing to rotate relative to the lower casing. For example, a ring of meshing teeth are provided at the position where the inner side wall of the upper casing contacts the lower casing, and a gear is provided at the position where the inner side wall of the lower casing contacts the upper casing. When the upper casing and the lower casing are fixedly connected, the meshing teeth of the upper casing mesh with the gear of the lower casing. The micro-motor drives the gears to rotate and further drives the meshing teeth, and thus drives the upper casing to rotate, thereby realizing the directional display of the display screen. In the present embodiment, the cavity enclosed by the lower casing and the bottom casing contains sound generating components, such as a speaker and a microphone.

In the present embodiment, the display screen of the audio equipment may follow the upper casing to rotate. Therefore, the display screen of the audio equipment can be controlled according to the following control method to realize the dynamic adjustment of display in the case of multi-person interactive use.

An aspect of the present disclosure provides a directional display method of audio equipment.

In the present embodiment, the audio equipment comprises a camera module and a display screen that is circumferentially located on sides of the audio equipment, and the display screen is rotatable relative to the audio equipment. For the structure of the audio equipment according to the present embodiment, it may refer to the relevant description above.

FIG. 1 is a flowchart of a directional display method of audio equipment according to an embodiment of the present disclosure. As shown in FIG. 1, the method according to the present embodiment comprises:

S110: activating the camera module for panoramic shooting to detect the user position in response to an activation signal acquired;

S120: determining whether the display screen is in half screen display mode, according to the relationship between the user position and the center position of the audio equipment;

In the present embodiment, the display screen is a circular display screen consisted of two curved display screens. After the audio equipment is powered on, either of the curved display screens can be activated to perform half screen display.

S130: when it is determined that the display screen is in half screen display mode, determining the compensation angle of the display direction of the half screen display area relative to the user position, and adjusting the display direction of the half screen display area so that the compensation angle is zero.

When it is determined that the display screen is in half screen display mode, the display area of the display screen is the currently working curved display screen. At this point, the compensation angle of the currently working curved display screen relative to the user position is determined to adjust the display direction of the curved display screen, so that when the audio equipment is in half screen display mode, the current curved display screen can track the user position and perform directional display.

The present embodiment detects the user position using the camera module, determines whether the display screen is in half screen display mode according to the relationship between the user position and the center position of the audio equipment; and when it is determined that the display screen is in half screen display mode, adjusts the display direction of the half screen display area so that the compensation angle of the display direction of the half screen display area relative to the user position is zero, to ensure that multiple users are all within the display area of the audio equipment and thus improving visual experience of the audio equipment in the case of multi-person interaction.

The above steps S110-S130 will be described in detail below with reference to FIG. 2 to FIG. 17.

First, step S110 is performed, namely, in response to an activation signal acquired, the camera module is activated to perform panoramic shooting to detect the user position.

In an embodiment, the activation signal includes an electrical signal generated from a voice signal carrying a preset keyword. The voice signal can be picked up by a microphone array in the audio equipment and converted into an electrical signal. When the voice signal carries a preset keyword, the detector array is activated according to the preset keyword carried. For example, the preset keyword includes "Xiaozhi (literally, Smart Guy)", the received voice signal is "hello, Xiaozhi", and the preset keyword "Xiaozhi" carried by the voice signal can be obtained through voice recognition. At this point, the camera module of the audio equipment can be activated for panoramic shooting to detect the user position according to an electrical signal generated from the voice signal. The camera module includes at least one panoramic camera, or at least one set of binocular cameras, or a spherical camera array having multiple cameras, so as to enable panoramic shooting, acquire panoramic images, and detect the user position based on the analysis of the panoramic images.

In the present embodiment, the activation signal acquired may be a periodic signal. According to the periodic characteristics of the activation signal, the camera module is periodically activated to perform panoramic shooting to detect the user position. For example, after activating the camera module for panoramic shooting for the first time, the camera mode is turned off, the user position is detected using the panoramic images captured, and the relationship between the user position and the center position of the audio equipment is acquired. After controlling the display to perform half screen display or full screen display based on the relationship between the user position and the center position of the audio equipment, at the node of the next period, the camera module is reactivated for panoramic shooting, the changes of users are analyzed based on the panoramic images, and the display is controlled to perform half screen display or full screen display based on the changes of users and the relationship between the user position and the center position of the audio equipment. When the period of the activation signal is set, the power consumed by the camera module and the accuracy of the display screen to locate and track the user position must be considered. For example, the period may be set to 5-20 minutes.

In the present embodiment, the user position is detected in the following way: first, continuously taking pictures using the camera module to acquire panoramic images centered on the center position of the audio equipment; then, determining a target in the panoramic image as a detected user according to position changes of the target relative to an background in the panoramic images at different moments; and then, determining the user position relative to the circumference of the display screen, according to the user position in the panoramic image and a preset relationship between a length of the panoramic image and a perimeter of the circumference of the display screen of the audio equipment.

Figure 7:
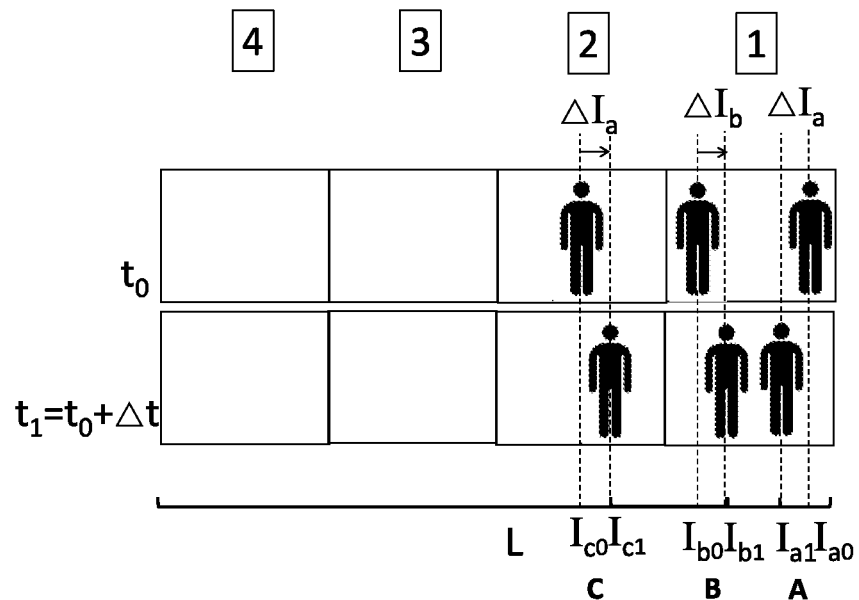
FIG. 7 is a schematic diagram of panoramic images at different moments according to an embodiment of the present disclosure.
Figure 11:
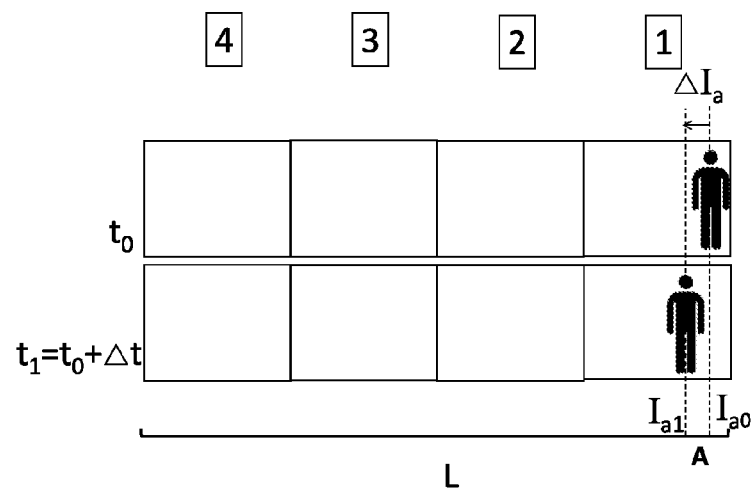
FIG. 11 is a schematic diagram of panoramic images at different moments according to an embodiment of the present disclosure.
Figure 15:
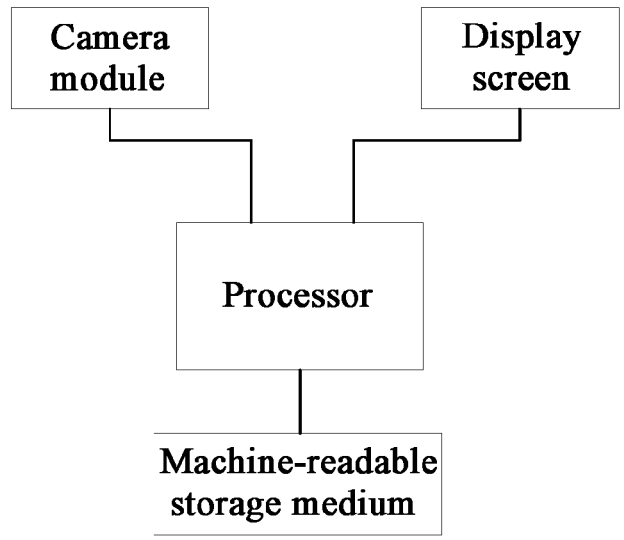
FIG. 15 is a block diagram of the structure of audio equipment according to an embodiment of the present disclosure.
Figure 16:
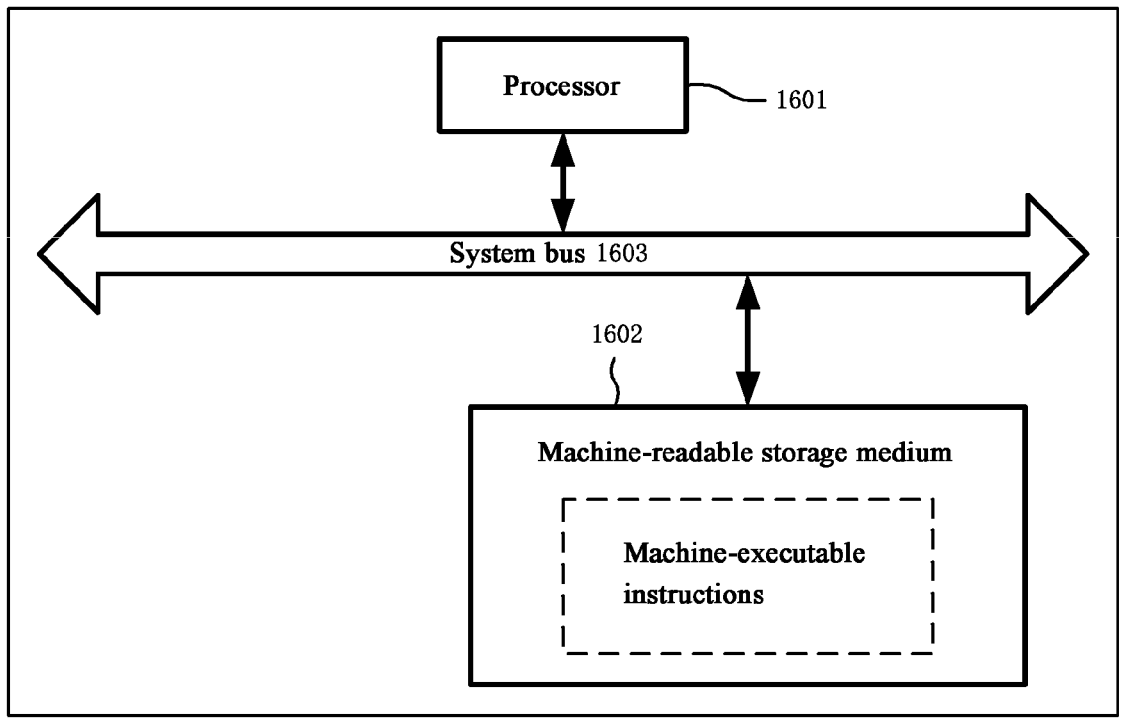
FIG. 16 is a schematic diagram of the hardware structure of a system according to an embodiment of the present disclosure.

Referring to FIG. 7, FIG. 11, and FIG. 15, the camera module continuously takes pictures, and the photos taken at different moments are compared to analyze whether there are users around the audio equipment and the number of users there. The user will not remain absolutely still at any moment, and a high-definition camera module can perfectly capture the user's movement. For example, in FIG. 7, the targets A, B, and C are in a space at the same time. After the camera module finished picture taking, two panoramic images are acquired at moment t0 and moment t1. Whether the target is a user can be determined by comparing the position changes of the same target in the two panoramic images. Take target A as an example, at moment t0, target A is at position Ia0, at moment t1, target A is at position Ia1. It can be determined that there is a position difference ΔIa between the positions of target A at moment to and moment t1, which indicates that at this point and in the same background, target A has moved, and target A is the user. Similarly, at moment t0 and moment t1, targets B and C have position differences ΔIb and ΔIc relative to the background of the panoramic image, and targets B and C are both detected users.

After analyzed the panoramic images at different moments and determined that there is a user in the panoramic image, the user position relative to the circumference of the display screen can be determined according to a preset relationship between a length of the panoramic image and a perimeter of the circumference of the display screen (for example, according to a length ratio relationship between the length of the panoramic image and the perimeter of circumference of the display screen), and according to the user position in the panoramic image. Referring to FIG. 7, the circumference of the display screen of audio equipment is a line segment with a certain length after expanded, and the length of the line segment and the length of the panoramic image are both L. Take one end of the line segment as the base point, and assume that the base point of the line segment corresponds to the right end of the panoramic image, it is determined that the distances between users A to C in the panoramic image and the right end of the panoramic image at moment t1 are respectively Ia1, Ib1, Ic1, then according to the following formula, the position of user A relative to the circumference of the display screen of the audio equipment can be determined as angle α, the position of user B relative to the circumference of the display screen of the audio equipment as angle β, and the position of user C relative to the circumference of the display screen of the audio equipment as angle γ.

$$\alpha = 2\pi \frac{\Delta I_{a1}}{L}, \beta = 2\pi \frac{\Delta I_{b1}}{L}, \gamma = 2\pi \frac{\Delta I_{c1}}{L}$$

After detecting the user position, continue to perform step S120, namely, according to the relationship between the user position and the center position of the audio equipment, determining whether the display screen is in half screen display mode.

In order to facilitate the calculation of the compensation angle of the display direction of the half screen display area relative to the user position, reduce the amount of calculation, and simplify the calculation steps, in the present embodiment, it is preset that the display direction includes a direction of display position indicated by a first connection line between the center position of the audio equipment and an arc center position of the half screen display area. The center position of the audio equipment is located on a space central vertical line of the audio equipment.

In the present embodiment, whether the display screen is in half screen display mode is determined by the following method: first, on the circumference of the display screen, acquiring a second connection line between a position corresponding to a user at one end of the panoramic image and a center position of the audio equipment, and on the circumference of the display screen, acquiring a third connection line between a position corresponding to a user at the other end of the panoramic image and the center position of the audio equipment; then, acquiring a first included angle between the second connection line and the third connection line, and determining a first projection angle of the first included angle on the horizontal plane, according to a horizontal distance and a vertical distance between the center position of the audio equipment and the circumference of the display screen; and then, determining whether the display screen is in half screen display mode according to the first projection angle.

Since in the present embodiment, the horizontal plane in which the center position of the audio equipment is located may not be the same horizontal plane in which the circumference of the display screen is located, the first included angle formed by the second connection line and the third connection line may have a projection angle on the horizontal plane. For audio equipment whose display screen can be rotated in a horizontal direction, in the present embodiment, the compensation angle of the half screen display area relative to the user position must be determined as an angle on the horizontal plane.

Figure 2:
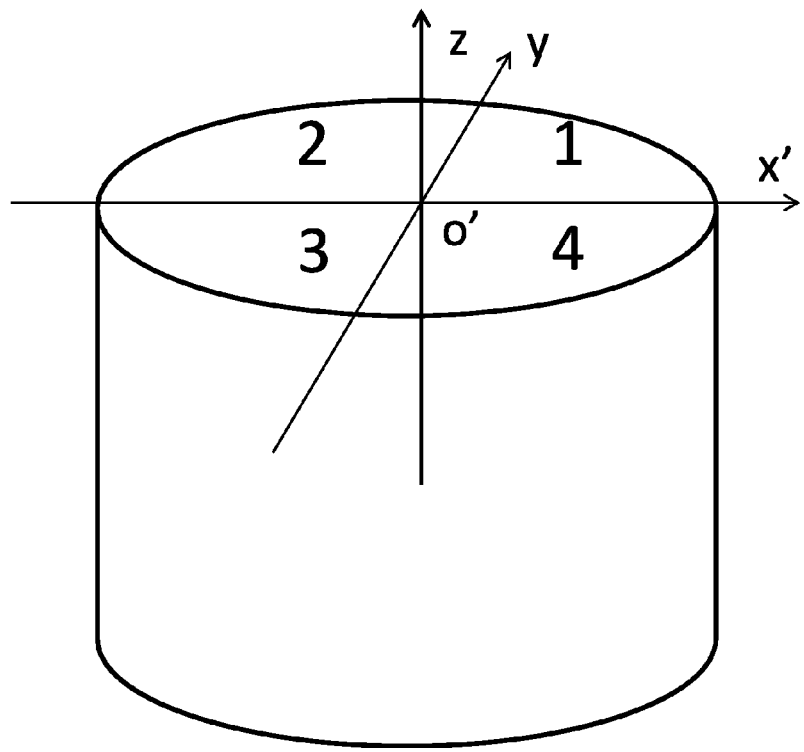
FIG. 2 is a schematic diagram of a spatial coordinate system established in audio equipment according to an embodiment of the present disclosure.

For ease of description, as shown in FIG. 2, a spatial rectangular coordinate system is established, in which the projection point of the center position of the audio equipment on the plane in which the circumference of the display screen is located is the coordinate origin O', the space central vertical line of the audio equipment is the Z axis, and two perpendicular lines in the plane in which the circumference of the display screen is located are the X' axis and Y' axis, respectively. Since the length of the circumference on which the display screen located is known, the angle of any point on the circumference of the display screen relative to the origin of the coordinate is determinate. Therefore, the position of user relative to the circumference of the display screen can be determined based on the ratio relationship between the perimeter of the circumference of the display screen and the length of the panoramic image, and the positional relationship among the positions of users in the panoramic image. Referring to FIG. 2, in the present embodiment, the numbers 1, 2, 3, 4 in FIG. 2 are used to represent four quadrants of the X'O'Y' plane, namely, the number 1 is used to represent the first quadrant, the number 2 is used to represent the second quadrant, the number 3 is used to represent the third quadrant, and the number 4 is used to represent the fourth quadrant.

Figure 4:
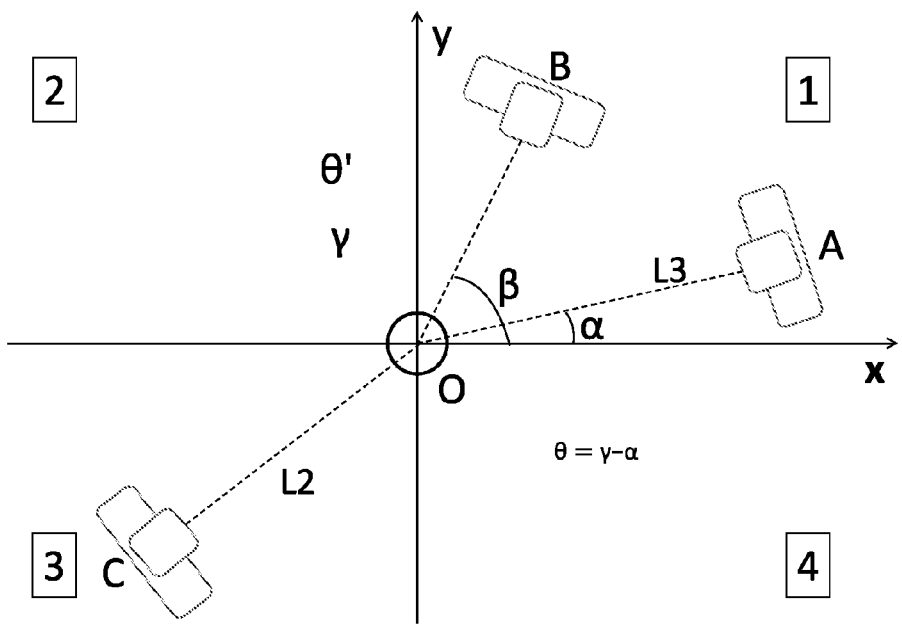
FIG. 4 is a schematic diagram of the positions of three users on the circumference of the display screen in a panoramic image according to an embodiment of the present disclosure.
Figure 5:
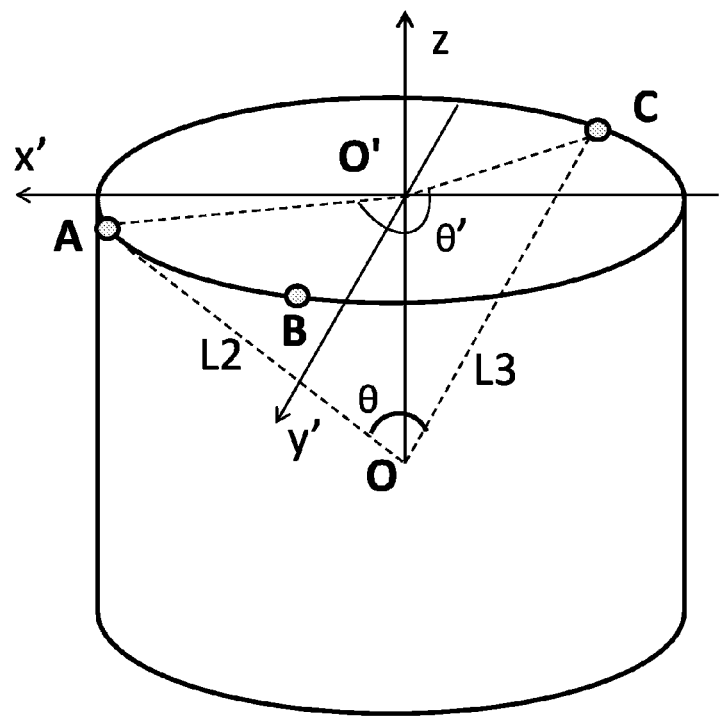
FIG. 5 is a schematic diagram of adjusting a half screen display area according to an embodiment of the present disclosure.
Figure 8:
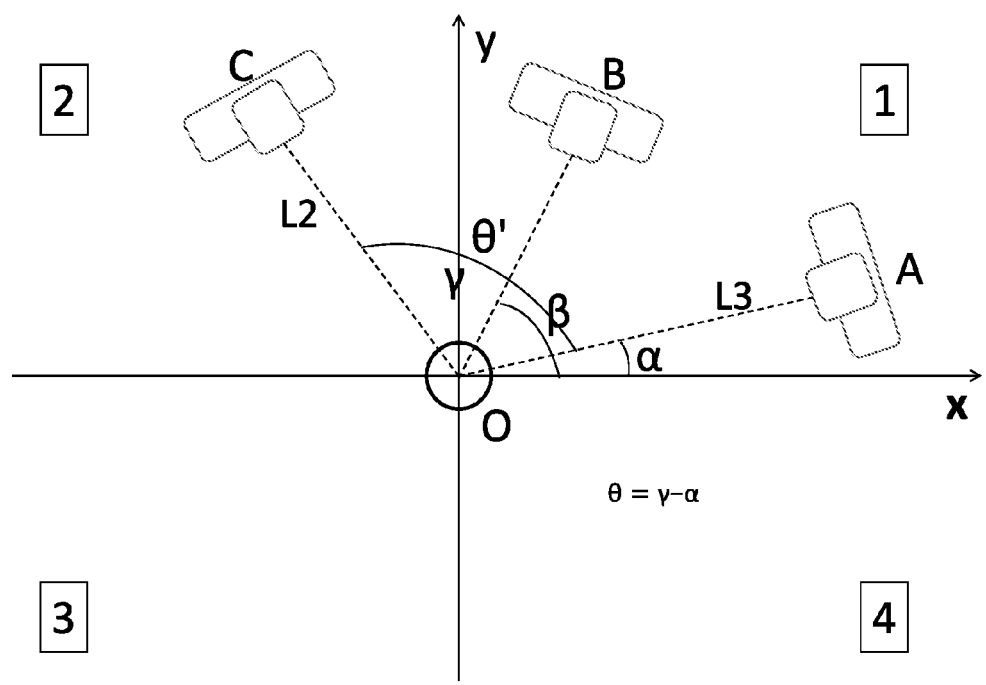
FIG. 8 is a schematic diagram of the positions of three users on the circumference of the display screen in a panoramic image according to an embodiment of the present disclosure.
Figure 9:
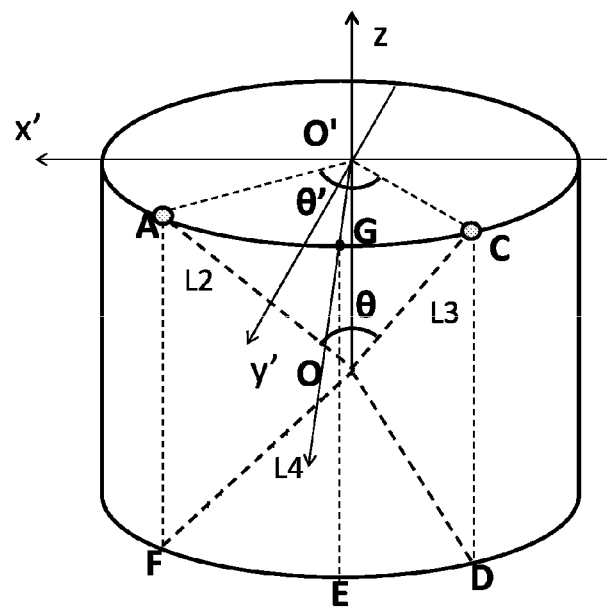
FIG. 9 is a schematic diagram of adjusting a half screen display area according to an embodiment of the present disclosure.

Referring to FIG. 4 and FIG. 8, it is assumed that after analyzing the panoramic images at moment t0 and moment t1, three users A to C are detected around the audio equipment, the positions (or angles) of users A to C relative to the circumference of the display screen are determined. After determined that the angle of user A relative to the circumference of the display screen is $\alpha$, the angle of user B relative to the circumference of the display screen is $\beta$, and the angle of user C relative to the circumference of the display screen is $\gamma$, on the circumference of the display screen, a second connection line L2 connecting a position corresponding to the user C at the left end of the panoramic image and a center position O of the audio equipment is acquired, and on the circumference of the display screen, a third connection line L3 connecting a position corresponding to the user A at the right end of the panoramic image and a center position O of the audio equipment is acquired. A first included angle $\theta$ between the second connection line L2 and the third connection line L3 is acquired, $\theta=\gamma-\alpha$. A first projection angle of the first included angle on the horizontal plane is determined, according to a horizontal distance and a vertical distance between the center position of the audio equipment and the circumference of the display screen. As shown in FIG. 5 and FIG. 9, the horizontal distance between the center position O of the audio equipment and the circumference of the display screen is the radius length of the circumference of the display screen, the vertical distance between the center position O of the audio equipment and the circumference of the display screen is OO', and the first projection angle of the first included angle $\theta$ on the horizontal plane is $\theta'$.

Figure 3:
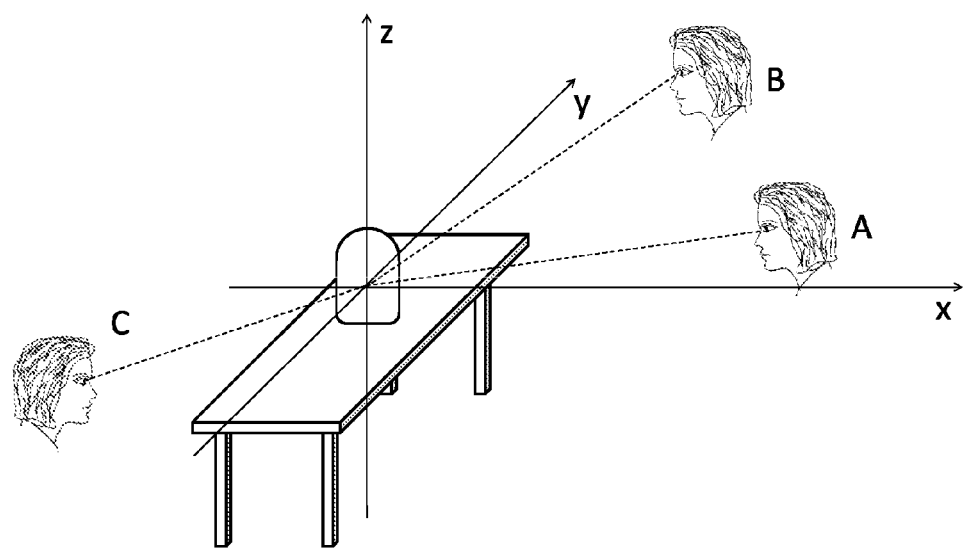
FIG. 3 is a schematic diagram of audio equipment used by three users according to an embodiment of the present disclosure.

When the first projection angle $\theta'$ is greater than a preset angle (assuming that the preset angle is 180°), referring to FIG. 3, on the circumference of the display screen, the included angle formed on the horizontal plane by the connecting lines between the positions correspond to the users A and C on the left and right ends of the panoramic image and the center position of the audio equipment is greater than 180°. At this point, it is determined that the display screen is in full screen display mode. As shown in FIG. 5, when it is in full screen display mode, there is no need to adjust the display direction.

Figure 6:
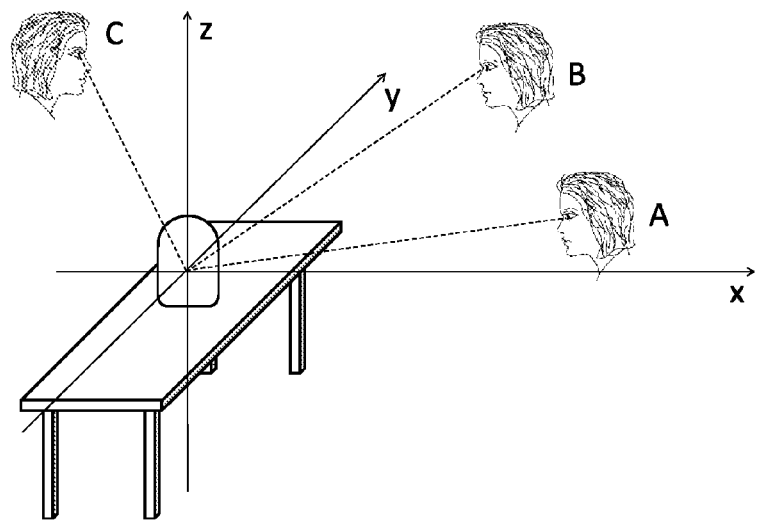
FIG. 6 is another schematic diagram of audio equipment used by three users according to an embodiment of the present disclosure.

When the first projection angle $\theta'$ is not greater than the preset angle (also assuming that the preset angle is 180°), referring to FIG. 6 and FIG. 8, on the circumference of the display screen, the included angle formed on the horizontal plane by the connecting lines between the positions correspond to the users A and C on the left and right ends of the panoramic image and the center position of the audio equipment is less than 180°. At this point, it is determined that the display screen is in half screen display mode.

After determined that the display screen is in half screen display mode, continue to perform step S130, namely, determining a compensation angle of a display direction of a half screen display area relative to the user position, and adjusting the display direction of the half screen display area so that the compensation angle is zero.

In an embodiment, a second projection angle of the second included angle on the horizontal plane is determined as the compensation angle of the display direction of the half screen display area relative to the user position, by acquiring a second included angle between an angle bisector of the first included angle and the first connection line, and according to a horizontal distance and a vertical distance between the center position of the audio equipment and the circumference of the display screen.

Referring to FIG. 8, assuming that the projection of the current display direction on the X'O'Y' plane is the direction of the positive half axis O'X' of the X' axis, then according to the method described above, when it is determined that the display screen is half screen display based on the situation that the first projection angle $\theta'$ of the first angle $\theta$ on the horizontal plane is less than 180° (the first included angle $\theta$ is formed by the second connection line L2 and the third connection line L3, the second connection line L2 is a connection line between a position on the circumference of the display screen corresponding to the user C on the left end of the panoramic image and a center position O of the audio equipment, and the third connection line L3 is a connection line between a position on the circumference of the display screen corresponding to the user A on the right end of the panoramic image and a center position O of the audio equipment), the second included angle formed on the plane between the angular bisector of the first included angle $\theta$ and the first connecting line is acquired as the compensation angle of the half screen display area relative to the user position. In other words, on the X'O'Y' plane, the included angle between the angular bisector L4 of the first projection angle $\theta'$ and the positive half axis O'X' of the X' axis is acquired as the compensation angle, the rotation adjustment of the display screen in the horizontal direction is performed according to the compensation angle, and the display direction of the half screen display area ACDF after adjusted is the direction L4 in FIG. 9, so that the center position of the half screen display area faces the middle position of users A to C, and the field of view of users A to C in the display area are balanced, thereby guaranteeing the visual experience of all users.

Figure 10:
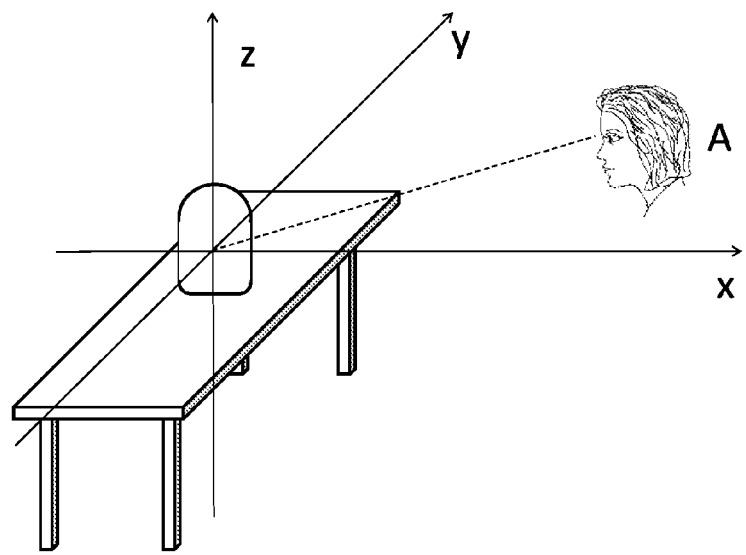
FIG. 10 is a schematic diagram of audio equipment used by single user according to an embodiment of the present disclosure.
Figure 12:
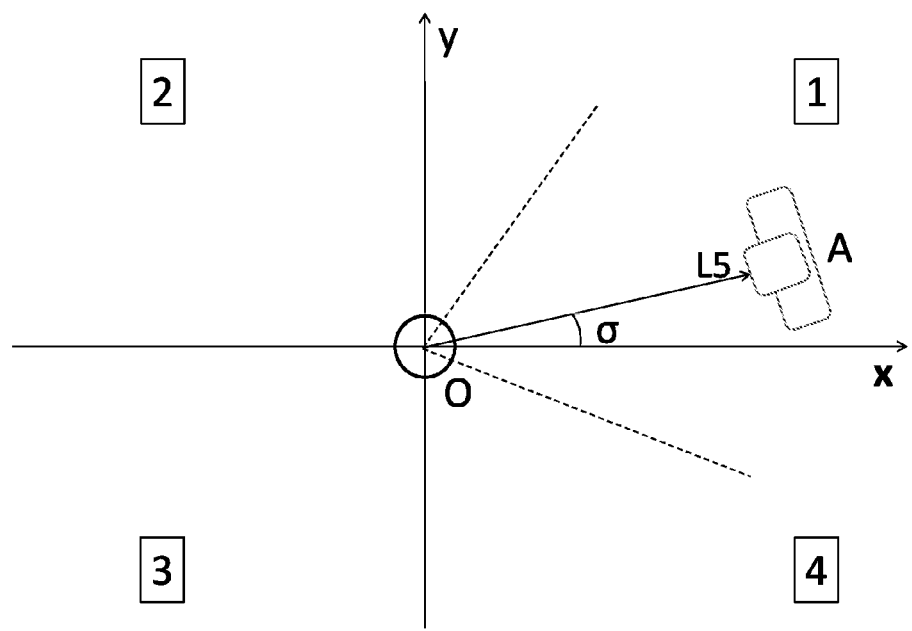
FIG. 12 is a schematic diagram of the position of single user on the circumference of the display screen in a panoramic image according to an embodiment of the present disclosure.

Of course, the method for controlling the display screen according to the present embodiment is still suitable for single user. As shown in FIG. 10 to FIG. 12, when the position of a single user A around the audio equipment is determined by analyzing the panoramic images at moment t0 and moment t1, the user A's position relative to the circumference of the display screen is determined, according to the user A's position in the panoramic image at moment t1 and the ratio relationship between the length of the panoramic image and the perimeter of the circumference of the display screen.

Figure 13:
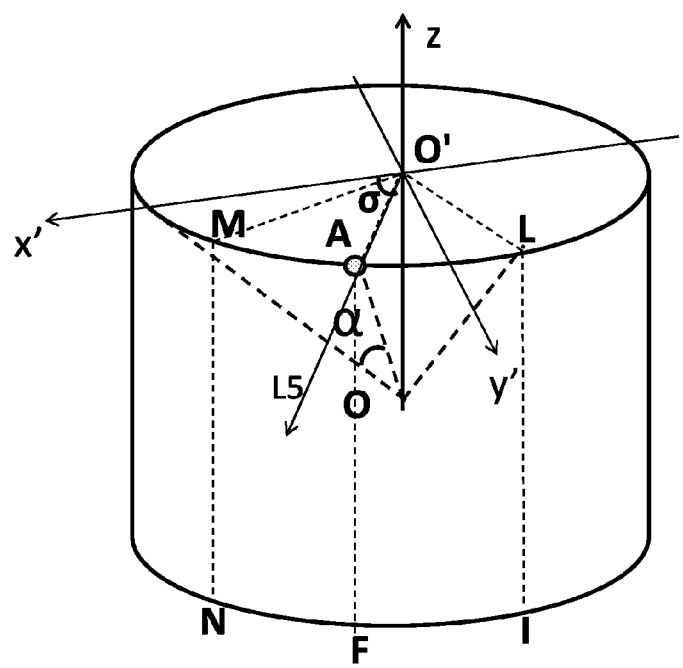
FIG. 13 is a schematic diagram of adjusting a half screen display area according to an embodiment of the present disclosure.

As shown in FIG. 13, assuming that the positive half axis OX of the X axis is the current display direction, i.e., the OX corresponds to the first connection line, on the circumference of the display screen, a third included angle $\alpha$ formed by a fifth connection line L5 and the first connection line OX is acquired, the fifth connection line L5 is the connection line between a position corresponding to the user A in the panoramic image and the center position O of the audio equipment. A third projection angle $\sigma$ of the third included angle $\alpha$ on the horizontal plane is determined as the compensation angle according to a horizontal distance and a vertical distance between the center position of the audio equipment and the circumference of the display screen. The rotation adjustment of the display screen in the horizontal direction is performed according to the third projection angle σ, and the display direction of the half screen display area MNIL after adjusted makes the compensation angle σ be zero.

The present disclosure provided a directional display device of audio equipment.

In the present embodiment, the audio equipment comprises a camera module and a display screen that is circumferentially located on sides of the audio equipment, and the display screen is rotatable relative to the audio equipment. The structure of the audio equipment may refer to the relevant description above of the audio equipment.

Figure 14:
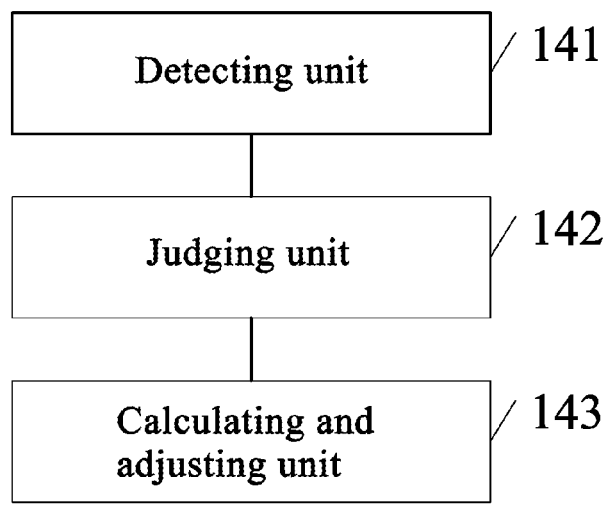
FIG. 14 is a schematic diagram of the structure of a directional display device of audio equipment according to an embodiment of the present disclosure.

FIG. 14 is a schematic diagram of the structure of a directional display device of audio equipment according to an embodiment of the present disclosure. As shown in FIG. 14, the device according to the present embodiment comprises:

- a detecting unit 141 for activating the camera module for panoramic shooting to detect a user position in response to an activation signal acquired;
- a judging unit 142 for determining whether the display screen is in half screen display mode according to a relationship between the user position and a center position of the audio equipment; and
- a calculating and adjusting unit 143 for, when it is determined that the display screen is in half screen display mode, determining a compensation angle of a display direction of a half screen display area relative to the user position, and adjusting the display direction of the half screen display area so that the compensation angle is zero.

The directional display device according to the present embodiment drives the camera module using the detecting unit to detect the user position. The judgment unit determines whether the display screen is in half screen display mode according to the relationship between the user position and the center position of the audio equipment. When it is determined that the display screen is in half screen display mode, the calculating and adjusting unit adjusts the display direction of the half screen display area so that the compensation angle of a display direction of the half screen display area relative to the user position is zero, to ensure that multiple users are all within the display area of the audio equipment and thus improving visual experience of the audio equipment in the case of multi-person interaction.

In the present embodiment, the display direction includes a direction of display position indicated by a first connection line between the center position of the audio equipment and a center position of the half screen display area. The center position of the audio equipment is located on a space central vertical line of the audio equipment.

In an embodiment, the detecting unit 141 is for continuously taking pictures using the camera module to acquire panoramic images centered on the center position of the audio equipment; determining a user in the panoramic image according to position changes of the foreground relative to the background in the panoramic images at different moments; and determining the user position relative to the circumference of the display screen according to the user position in the panoramic image and a preset relationship between the length of the panoramic image and the perimeter of the circumference of the display screen.

Correspondingly, the judging unit 142 is for acquiring a second connection line on the circumference of the display screen between a position corresponding to a user on the left end of the panoramic image and the center position of the audio equipment, and acquiring a third connection line on the circumference of the display screen between a position corresponding to a user on the right end of the panoramic image and the center position of the audio equipment; acquiring a first included angle between the second connection line and the third connection line, and determining a first projection angle of the first included angle on the horizontal plane according to a horizontal distance and a vertical distance between the center position of the audio equipment and the circumference of the display screen; and determining whether the display screen is in half screen display mode according to the first projection angle. The judging unit 182 is specifically for, when the first projection angle is greater than a preset angle, determining that the display screen is in full screen display mode, and when the first projection angle is not greater than the preset angle, determining that the display screen is in half screen display mode.

The calculating and adjusting unit 143 is for when determined that it is in half screen display mode, acquiring a second included angle between an angle bisector of the first included angle and the first connection line, and determining a second projection angle of the second included angle on the horizontal plane as the compensation angle of the display direction of the half screen display area relative to the user position, according to the horizontal distance and the vertical distance between the center position of the audio equipment and the circumference of the display screen.

The device embodiments are substantially correspond to the method embodiments, so the relevant contents may refer to the description of the corresponding parts of the method embodiments. The device embodiments described above are merely illustrative, in which the units described as separate components may or may not be physically separated, and the components illustrated as units may or may not be physical units. In other words, they may be located in one place, or distributed in multiple network units. Some or all of the modules can be selected according to actual needs to achieve the objectives of the solutions of the present embodiment. Those of ordinary skill in the art can understand and implement them without paying creative efforts.

Another aspect of the present disclosure provides audio equipment.

FIG. 15 is a block diagram of the structure of the audio equipment according to an embodiment of the present disclosure. As shown in FIG. 15, the audio equipment comprises a camera module and a display screen that is circumferentially located on sides of the audio equipment. The display screen is rotatable relative to the audio equipment. The audio equipment further comprises a processor and a machine-readable storage medium having machine-executable instructions stored thereon, and by reading and executing the machine-executable instructions in the machine-readable storage medium, the processor can execute the directional display method of audio equipment described above.

In the present embodiment, when it is determined that the display screen is in half screen display mode, and after the compensation angle of the display direction of the half screen display area relative to the user position is acquired, the motor drives the gear to drive the upper casing to rotate by the compensation angle acquired, so that after adjusted, the compensation angle of the display direction of the half screen display area relative to the user position is zero, to ensure that multiple users are all within the display area of the audio equipment, and thus improving visual experience of the audio equipment in the case of multiple users.

Another aspect of the present disclosure provides a system.

The system provided in the present disclosure can be implemented by software, or by hardware, or by a combination of software and hardware. Take software implementation as an example, referring to FIG. 16, the system provided in the present disclosure may comprise a processor 1601 and a machine-readable storage medium 1602 having machine-executable instructions stored thereon. The processor 1601 and the machine-readable storage medium 1602 may communicate via a system bus 1603. In addition, by reading and executing the machine-executable instructions corresponding to the directional display logic of the audio equipment in the machine-readable storage medium 1602, the processor 1601 can execute the directional display method of audio equipment described above.

Another aspect of the present disclosure provides a machine-readable storage medium.

The machine-readable storage medium according to the embodiment of the present disclosure has machine-executable instructions stored thereon, and when executed by a processor, the machine-executable instructions can realize the directional display method of audio equipment described above.

It should be noted that the readable storage medium according to the embodiment of the present disclosure may be, for example, any medium that can contain, store, transmit, propagate, or transmit instructions. For example, the readable storage medium may include, but is not limited to, electric, magnetic, optical, electromagnetic, infrared, or semiconductor system, apparatus, device, or propagation medium. Specific examples of the readable storage medium include: a magnetic storage device, such as a magnetic tape or hard disk (HDD); an optical storage device, such as an optical disk (CD-ROM); a memory, such as a random access memory (RAM) or a flash memory; and/or a wired/wireless communication link.

The machine-readable storage medium may include a computer program, and the computer program may include code/computer-executable instructions, which, as executed by the processor, for example, the flow process of the directional display method of audio equipment described above and any variations thereof are executed by the processor.

The computer program may be configured to have, for example, computer program codes including computer program modules. For example, in an exemplary embodiment, the codes in the computer program may include one or more program modules. It should be noted that the division method and number of modules are not fixed. Those skilled in the art can use appropriate program modules or combinations of the program module according to the actual situation. When these combinations of the program modules are executed by the processor, for example, the flow process of the directional display method of audio equipment described above and any variations thereof are executed by the processor.

In order to clearly describe the technical solutions of the embodiments of the present disclosure, in the embodiments of the present disclosure, terms such as "first" and "second" are used to distinguish the same or similar items having substantially the same functions and effects. A person skilled in the art can understand that the terms "first" and "second" do not limit the quantity and order of execution.

The description above is merely specific embodiments of the present disclosure. With the foregoing teachings of the present disclosure, a person skilled in the art may make other improvements or modifications based on the foregoing embodiments. A person skilled in the art should understand that the specific description above is only for better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A directional display method of audio equipment, wherein the audio equipment comprises a camera module and a display screen that is circumferentially located on sides of the audio equipment, the display screen is rotatable relative to the audio equipment, and the method comprises:
    activating the camera module for panoramic shooting to detect a user position in response to an activation signal acquired;
    determining whether the display screen is in half screen display mode according to a relationship between the user position and a center position of the audio equipment; and
    when it is determined that the display screen is in half screen display mode, determining a compensation angle of a display direction of a half screen display area relative to the user position, and adjusting the display direction of the half screen display area so that the compensation angle is zero,
    wherein the display direction includes a direction of display position indicated by a first connection line between the center position of the audio equipment and an arc center position of the half screen display area, wherein the center position of the audio equipment is located on a space central vertical line of the audio equipment,
    wherein activating the camera module for panoramic shooting to detect the user position comprises:
    continuously taking pictures using the camera module to acquire panoramic images centered on the center position of the audio equipment;
    determining a target in the panoramic image as a detected user according to position changes of the target relative to a background in the panoramic images at different moments; and
    determining the user position relative to a circumference of the display screen according to the user position in the panoramic image and a preset relationship between a length of the panoramic image and a perimeter of the circumference of the display screen.

2. The method according to claim 1, wherein the camera module includes at least one panoramic camera, or at least one set of binocular cameras, or a spherical camera array having multiple cameras.

3. An audio equipment, comprising a camera module and a display screen that is circumferentially located on sides of the audio equipment, wherein the display screen is rotatable relative to the audio equipment, the audio equipment further comprises a processor and a non-transitory machine-readable storage medium having machine-executable instructions stored thereon, and the processor can execute the directional display method of audio equipment according to claim 2, by reading and executing the machine-executable instructions in the machine-readable storage medium.

4. An audio equipment, comprising a camera module and a display screen that is circumferentially located on sides of the audio equipment, wherein the display screen is rotatable relative to the audio equipment, the audio equipment further comprises a processor and a non-transitory machine-readable storage medium having machine-executable instructions stored thereon, and the processor can execute the directional display method of audio equipment according to claim 1, by reading and executing the machine-executable instructions in the machine-readable storage medium.

5. The audio equipment according to claim 4, wherein the display screen rotatable relative to the audio equipment is provided in an upper casing of the audio equipment, a gear is provided inside the upper casing of the audio equipment, a gear ring meshing with the gear is provided on the inner wall of the lower casing of the audio equipment, and the gear is driven by a motor.

6. A non-transitory machine-readable storage medium having machine-executable instructions stored thereon, wherein when executed by a processor, the machine-executable instructions can realize the directional display method of audio equipment according to claim 1.

7. The method according to claim 1, wherein determining whether the display screen is in half screen display mode according to a relationship between the user position and a center position of the audio equipment comprises:
  acquiring a second connection line between a position corresponding to a user at one end of the panoramic image and a center position of the audio equipment on the circumference of the display screen, and acquiring a third connection line between a position corresponding to a user at the other end of the panoramic image and a center position of the audio equipment on the circumference of the display screen;
  acquiring a first included angle between the second connection line and the third connection line, and determining a first projection angle of the first included angle on the horizontal plane, according to a horizontal distance and a vertical distance between the center position of the audio equipment and the circumference of the display screen; and
  determining whether the display screen is in half screen display mode according to the first projection angle.

8. The method according to claim 7, wherein determining whether the display screen is in half screen display mode according to the first projection angle comprises:
  when the first projection angle is greater than a preset angle, determining that the display screen is in full screen display mode;
  when the first projection angle is not greater than the preset angle, determining that the display screen is in half screen display mode.

9. The method according to claim 7, wherein when it is determined that the display screen is in half screen display mode, determining a compensation angle of the display direction of the half screen display area relative to the user position comprises:
  acquiring a second included angle between an angle bisector of the first included angle and the first connection line, and determining a second projection angle of the second included angle on the horizontal plane as a compensation angle of the display direction of the half screen display area relative to the user position, according to a horizontal distance and a vertical distance between the center position of the audio equipment and the circumference of the display screen.

10. A directional display device of audio equipment, wherein the audio equipment comprises a camera module and a display screen that is circumferentially located on sides of the audio equipment, the display screen is rotatable relative to the audio equipment, and the device comprises:
  a detecting unit for activating the camera module for panoramic shooting to detect a user position in response to an activation signal acquired;
  a judging unit for determining whether the display screen is in half screen display mode according to a relationship between the user position and a center position of the audio equipment; and
  a calculating and adjusting unit for, when it is determined that the display screen is in half screen display mode, determining a compensation angle of a display direction of a half screen display area relative to the user position, and adjusting the display direction of the half screen display area so that the compensation angle is zero,
  wherein the display direction includes a direction of display position indicated by a first connection line between the center position of the audio equipment and an arc center position of the half screen display area, wherein the center position of the audio equipment is located on a space central vertical line of the audio equipment,
  wherein activating the camera module for panoramic shooting to detect the user position comprises:
  continuously taking pictures using the camera module to acquire panoramic images centered on the center position of the audio equipment;
  determining a target in the panoramic image as a detected user according to position changes of the target relative to a background in the panoramic images at different moments; and
  determining the user position relative to a circumference of the display screen according to the user position in the panoramic image and a preset relationship between a length of the panoramic image and a perimeter of the circumference of the display screen.

* * * * *